United States Patent [19]

Sturniolo

[11] 4,353,607

[45] Oct. 12, 1982

[54] ROLLING BEARING

[75] Inventor: Giuseppe Sturniolo, Turin, Italy

[73] Assignee: RIV SKF Officine di Villar Perosa S.P.A., Torino, Italy

[21] Appl. No.: 174,357

[22] Filed: Aug. 1, 1980

[30] Foreign Application Priority Data

Aug. 1, 1979 [IT] Italy .............................. 68594 A/79

[51] Int. Cl.³ .............................................. F16C 19/26
[52] U.S. Cl. ..................................... 308/214; 308/211
[58] Field of Search .................... 308/202, 207 R, 211, 308/214, 216, 218

[56] References Cited

U.S. PATENT DOCUMENTS

| | | | |
|---|---|---|---|
| 1,265,090 | 5/1918 | King | 308/211 |
| 3,133,770 | 5/1964 | Cowles | 308/218 |
| 3,494,683 | 2/1970 | Teramachi | 308/214 |
| 3,707,315 | 12/1972 | Goodfellow | 308/216 |

FOREIGN PATENT DOCUMENTS

| | | | |
|---|---|---|---|
| 1065227 | 9/1959 | Fed. Rep. of Germany | 308/214 |
| 1575624 | 2/1970 | Fed. Rep. of Germany | 308/214 |
| 395604 | 7/1933 | United Kingdom | 308/216 |

Primary Examiner—Richard R. Stearns
Attorney, Agent, or Firm—Gifford, VanOphem, Sheridan & Sprinkle

[57] ABSTRACT

The rolling bearing, comprising at least a pair of rings comprising an inner and an outer ring each of which is provided with a tapered rolling race and one or more rows of rolling bodies disposed between the said rings and apt to roll on corresponding races; each of said bodies being defined by an outer conical surface, and the respective axis laying on a conical surface, is characterized in that the ratio between the axial length L and the maximum diameter 2R of each of said bodies is more than 3.

1 Claim, 6 Drawing Figures

ROLLING BEARING

BACKGROUND OF THE INVENTION

The present invention relates to a rolling bearing of the type which is apt to support both radial and axial loads, which bearing will have a high load capacity, as well as very reduced radial dimensions.

In the construction of machines it is often necessary to support in rotation members of various types, particularly shafts, by means of rolling bearings by which the following three conditions have to be complied with at the same time: supporting not only the axial, but also the radial loads acting onto the rotating members, providing a high load capacity, in particular as regards radial loads, and obtaining very limited radial dimensions. These conditions are imposed by the present constructional tendency both towards a more and more complete exploitation of the resistance of the materials and towards the reduction of the dimensions and the increase of the complexity of the mechanical units, particularly in some advanced machine-building fields (aeronautical and automotive).

To support in rotation a rotating member trying to comply with the three mentioned conditions, various types of rolling bearings may be used in combination. According to a first constructional solution, to support the radial loads cylindrical needle bearings may be used (i.e. bearings provided with very thin rings having disposed therebetween one or more rows of cylindrical rollers having a very reduced diameter and a very great length) and to support the axial loads normal thrust bearings, for example ball bearings, may be used. The former are apt to comply with the requirements of high load capacity and reduced radial dimensions, whilst the latter are apt to comply with the axial load capacity requirement. The assemblies obtained in this way are not fully satisfactory, nor are they apt to correspond to the requirements indicated hereinabove. In fact, first of all, they are generally complex and expensive, because of the presence of the two types of bearings which require particular assembly modalities (backing rings, adjustment elements and the like); in addition, if the cylindrical needle bearings correspond to the requirement of limited radial dimensions, this requirement, usually, cannot be completely complied with where normal thrust bearings are used.

A different constructional solution may be obtained by using a pair of taper roller bearings mounted with convergent or divergent taper. If, in this case, the requirement of load capacity in the two main directions (radial and axial) are entirely complied with, the requirement of high load capacity and especially that of limited radial dimensions are not complied with at all. In fact, as is well-known, the radial loads being equal, the taper roller bearings have larger radial dimensions than the cylindrical roller bearings and therefore are able to support heavy loads only when their dimensions are rather large.

SUMMARY OF THE INVENTION

The object of the present invention is to provide a rolling bearing with which it will be possible to meet the three conditions specified hereinabove and thus obtain assemblies of rotating members avoiding the above-mentioned disadvantages.

The bearing according to the present invention, comprising at least a pair of rings comprising an inner and an outer ring each of which is provided with a tapered rolling race and one or more rows of rolling bodies disposed between the said rings and apt to roll on corresponding races, each of said bodies being defined by an outer conical surface, and the respective axis lying on a conical surface, is characterized in that the ratio between the axial length L and the maximum diameter 2 R of each of said bodies is more than 3.

In the bearing according to the invention the ratio between the axial length of the bearing and the half difference $(D-d)/2$ between the outer diameter D of the outer ring and the inner diameter d of the inner ring is more than 2.

BRIEF DESCRIPTION OF THE DRAWINGS

For a better understanding of the structure and characteristics of the bearing of the invention, some embodiments thereof will now be described in detail with reference to the accompanying drawings, in which.

DETAILED DESCRIPTION OF THE INVENTION

Figure 1:
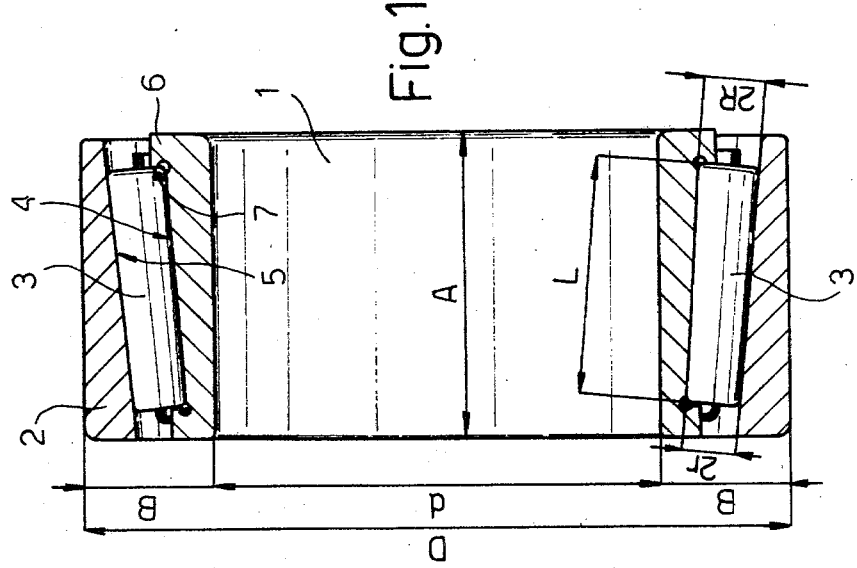
FIG. 1 is a sectional view along a diametrical plane, showing a portion of the bearing of the invention according to a first embodiment.

Referring now to FIG. 1, the bearing according to the invention comprises a pair of rings, i.e. an inner ring 1 and an outer ring 2, between which there is disposed a row of rolling bodies 3.

The inner ring 1 is provided with a rolling race 4 apt to form a rolling seating for the rolling bodies 3; this rolling race is formed by conical surface whose axis coincides with the axis of the ring; analogously, the outer ring 2 is provided with a rolling race 5 formed also by a conical surface whose axis coincides with the axis of the said ring.

Each rolling body 3 is formed by a needle defined laterally by a conical surface of predetermined taper. The half opening of each conical surface of the rolling race 4 of the inner ring and the rolling race 5 of the outer ring is selected in such a way that the conical surface of each needle 3 will rest on each of the said conical surfaces substantially along a generatrix, as shown in FIG. 1.

Each rolling body has a great axial length L and very small minimum and maximum diameters 2 r and 2 R, respectively (r and R indicating the minimum and the maximum radii, respectively). It has been found that to attain the objects aimed at by the bearing of the present invention it is necessary the ratio L/2 R between the axial length and the said maximum diameter to be equal to or higher than 3.

Also the thickness, measured in a radial direction, of each inner and outer ring 1 and 2, respectively, is very small; it has been found that the thicknesses which fall within the scope of those which may be of interest for the bearing according to the present invention are the thicknesses which provide a ratio of more than 2 between the axial length A and the radial dimension B of the bearing (equal to the half difference (D−d)/2 between the outer diameter D of the outer ring 2 and the inner diameter d of the inner ring 1).

Preferably, the taper of each rolling body 3 is very small; and accordingly the ratio (2 R−2 r)/L of the difference between the maximum and minimum diameters 2 R and 2 r, respectively, and the axial length of each rolling body, is very small as well.

The rolling bodies 3 interposed between the rings 1 and 2 may freely come into contact with one another, as well as with the races 4 and 5 of the rings; in this case, which corresponds to a complete filling of the annular space between the said races, no spacer cage for the rolling bodies is necessary. A cage of this type, having a configuration and a structure similar to those of the cages which are normally used in rolling bearings, may, however, be used to space and guide the rolling bodies.

Conveniently formed on the inner ring 1, on the side with the respective rolling race 4 where the diameter is larger, is an annular relief 6 arranged to originate a shoulder 7 on which the end surfaces of the rolling bodies 3 rest, as can be seen in the embodiment shown in FIG. 1.

Figure 2:
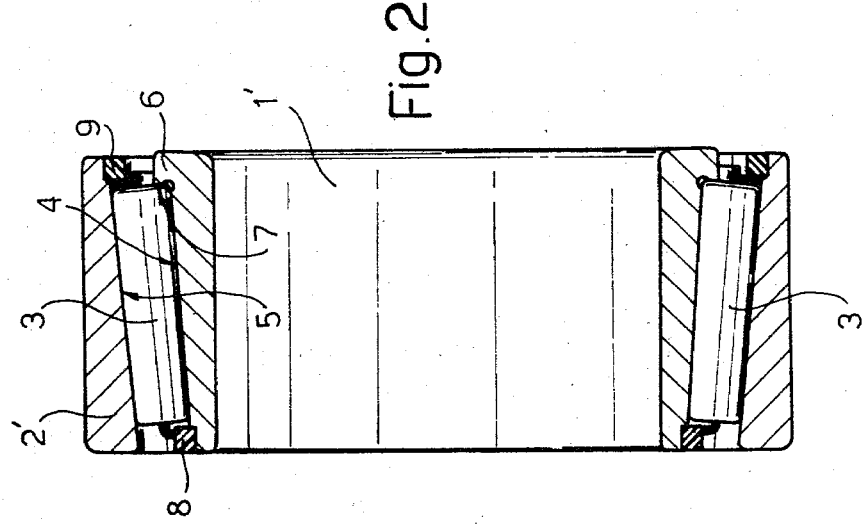
FIG. 2 is a sectional view similar to that of FIG. 1, showing a different embodiment of the bearing according to the invention.

Should it be preferable the various elements of the bearing according to the invention (rings and rolling bodies) not to be accidentally separable during manipulation of the bearing, for instance during the assembly, it may convenient to provide further shoulders on the rings. In the embodiment shown in FIG. 2, conceived for attaining this aim, there are provided ring members 8 and 9 respectively on the inner ring 1' (on the side opposed to that on which the relief 6 is located) and on the outer ring 2' on the side where the diameter of the respective rolling race 5 is larger. The said ring members, made of any suitable material, for example a deformable material, such as plastics, may be mounted on the respective rings, for example by interference, or in any other suitable way. It is clear that with the structural arrangement shown in FIG. 2 the outer ring 2' cannot be separated from the rolling bodies 3 because of the presence of the ring member 9, and these bodies cannot be separated from the inner ring 1' because of the presence of the ring member 8.

Figure 3:
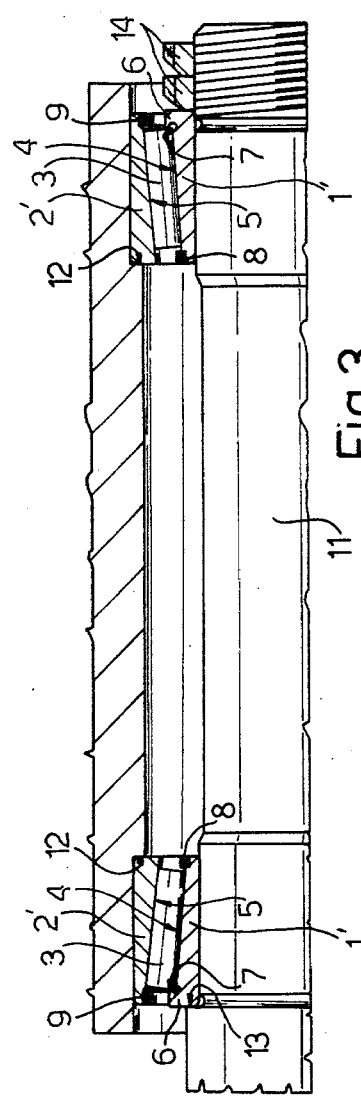
FIGS. 3 and 4 are longitudinal sections of a portion of a rotating member supported in rotation by means of a pair bearings according to the present invention.
Figure 4:
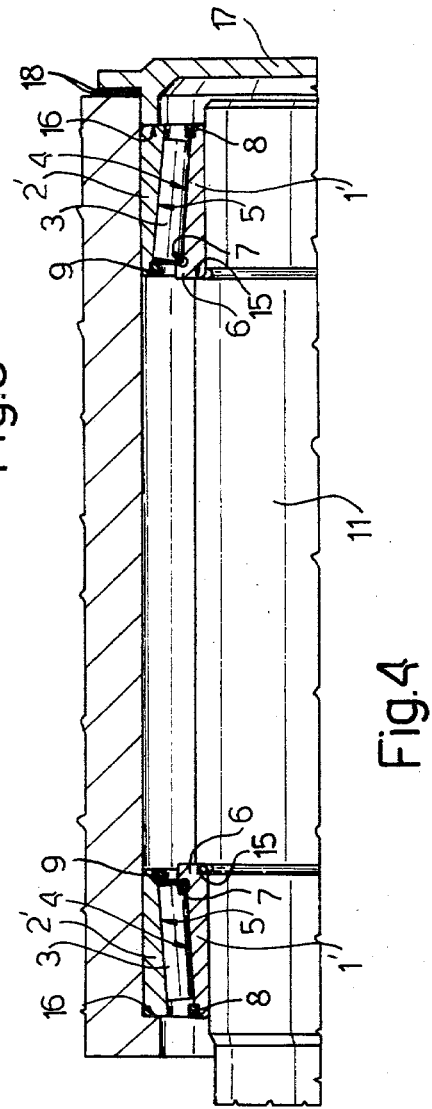

The bearing described hereinabove may be mounted in accordance with the modalities used in the assemblies with ball and taper roller oblique bearings; FIGS. 3 and 4 show two examples of such assemblies. In the assembly illustrated in FIG. 3, a rotating element 11, for example a shaft, is supported by two bearing according to the invention mounted with convergent tapers (i.e., the apex of the conical surfaces on which the axes of the rolling bodies 3 of each bearing are resting, is situated on the side facing the other bearing); the outer ring 2 of each of these bearings rests on a shoulder 12 of the casing, whilst a shoulder 13 of the shaft and a ring nut 14 screwed onto the shaft rest on the inner ring of a bearing and on the inner ring of the other bearing respectively, in order to carry out a correct adjustment of the clearings between rolling bodies 3 and respective rolling races 4 and 5 of the two bearings.

In the assembly shown in FIG. 4 the two bearings which support the rotating element 11 are mounted with divergent tapers (i.e., the apex of the conical surfaces having resting thereon the axes of the rolling bodies of each bearing is situated on the side opposed to that facing the other bearing); the inner rings 1' rest on shoulders 15 of the shaft 11 and the outer rings 2' rest on shoulders 16 of the casing and of a closure cover 17; disposed between this latter and the casing are adjustment spacers 18.

It is clear that the bearing according to the present invention is apt to support not only radial loads, but also axial loads, owing to the conical shape of the rolling races 4 and 5 and the rolling bodies 3. Moreover, its capacity of supporting equivalent loads is very high owing to the considerable length of the generatrixes in contact with conical surfaces of the rolling bodies 3 and the rolling races 4 and 5. As is known, on the ground of Hertz theory, the load capacity of bearing is also proportional to the said length.

In addition, the two favorable conditions (load capacity in the two directions and capacity of supporting high equivalent loads) are combined with very small radial dimension of the bearing, owing to the small average diameter of the rolling bodies 3 and the small thickness of the rings 1' and 2' as a consequence of the high value of the ratio between the length L and the maximum diameter 2 R of the rolling bodies.

It is clear that included in the scope of the present invention are also the bearings with two rows of needles, constructed in accordance with the concept of the present invention, i.e. by utilizing rolling bodies formed by taper needles having dimensions comprised within the range specified hereinabove.

Figure 6:
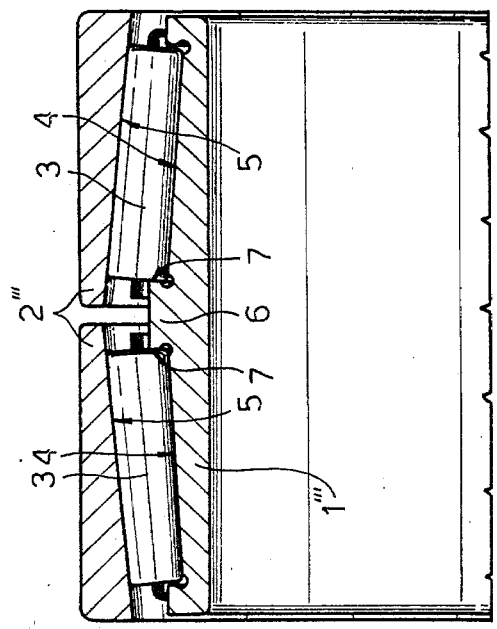
FIGS. 5 and 6 show two other embodiments of the bearing according to the present invention.
Figure 5:
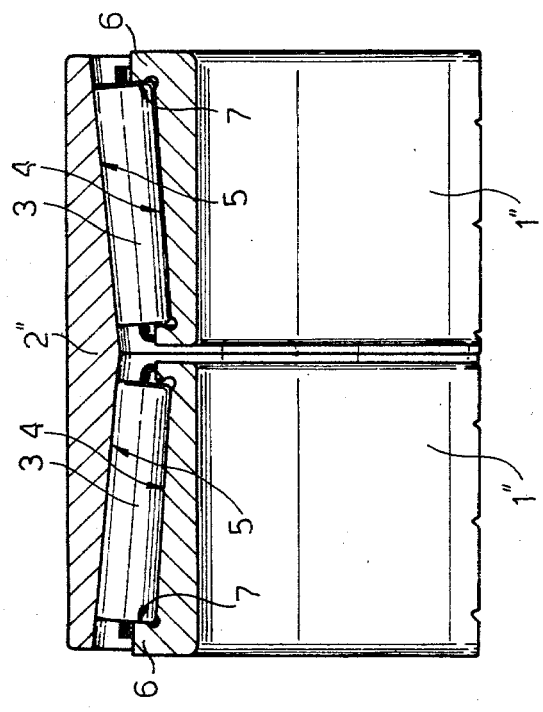

FIGS. 5 and 6 show two of such bearings comprising two rows of needles having, respectively, convergent and divergent taper.

As can be seen in these Figures, each of the said bearings may be thought as being obtained by placing side by side two bearings according to the embodiment described above and by manufacturing the two outer or inner rings of said bearings in the form of a single ring 2'' (FIG. 5) or 1'' (FIG. 6). In fact, as can be seen, in the case of FIG. 5 the outer ring 2'' is unique, while in the case of the FIG. 6 the unique ring is the inner ring. 1'''. It is obvious that bearings obtained in this way fall within the inventive idea described hereinbove, if the ratio L/2 R between the axial length L of each needle 3 and the maximum diameter 2 R of the needle is equal to or higher than 3; however, in this case, the axial length of the double bearing being twice as large as that of a simple bearing, the ratio between the axial length of the bearing and its radial dimension (equal to the half difference (D−d)/2 between the outer diameter D of the outer ring 2 and the inner diameter d of the inner ring) is more than 4.

It is obvious that many modifications and variations as regards both the shape and the arrangement of the various parts may be made to the bearing according to the invention, without departing from the scope of the invention.

I claim:

1. A rolling bearing comprising:
   an inner ring and an outer ring, said inner ring having an outer conical race and outer ring having an inner conical race,
   one or more rows of rolling bodies disposed between the said rings so that said bodies roll between said conical races,
   said inner ring having an inner cylindrical surface and said outer ring having an outer cylindrical surface,
   each of said rolling bodies having an outer conical surface and the axes of said bodies lying on a further conical surface,
   wherein said bodies are dimensioned so that the ratio between the axial length of each body and the maximum diameter of each body is more than three, and wherein the ratio between the axial length of the bearing and the distance between the outer surface of the outer ring and the inner surface of the inner ring is more than two, a first cylindrical retainer surface formed circumferentially around the inner ring conical race at the end of the inner ring conical race having the smaller diameter, said first cylindrical retainer surface being open to an end of said inner ring, a second cylindrical retainer surface formed circumferentially around the outer ring conical race at the end of the outer ring conical race having the larger diameter, said second cylindrical retainer surface being open to an end of said outer ring opposite from said end of said inner ring, a first retaining ring constructed of a deformable plastic material and secured by an interference fit to said first cylindrical retainer surface and second retaining ring constructed of a deformable plastic material and secured by an interference fit to said second cylindrical retainer surface.

* * * * *